No. 675,371. Patented June 4, 1901.
J. BRAGGE.
CARRIAGE TRUCK FOR RAILWAYS.
(Application filed Sept. 28, 1900.)
(No Model.) 2 Sheets—Sheet 1.
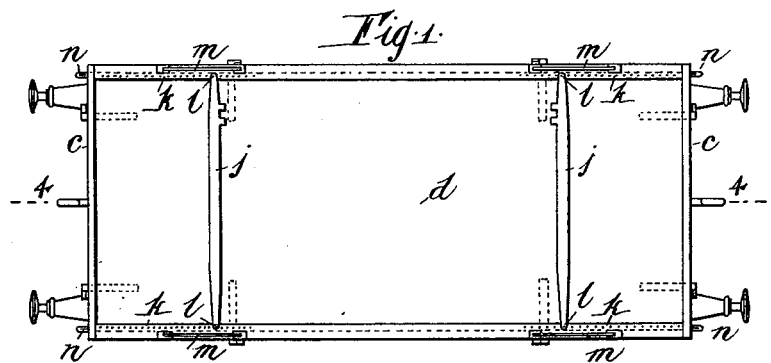
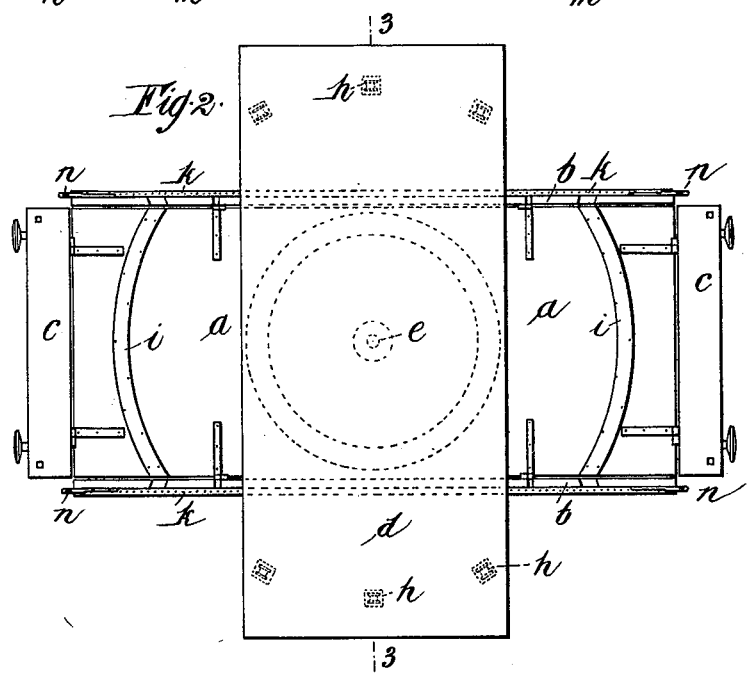
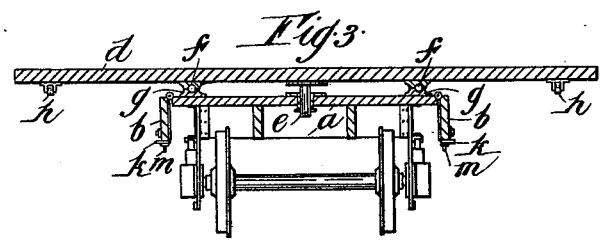

No. 675,371. Patented June 4, 1901.
J. BRAGGE.
CARRIAGE TRUCK FOR RAILWAYS.
(Application filed Sept. 28, 1900.)
(No Model.) 2 Sheets—Sheet 2.
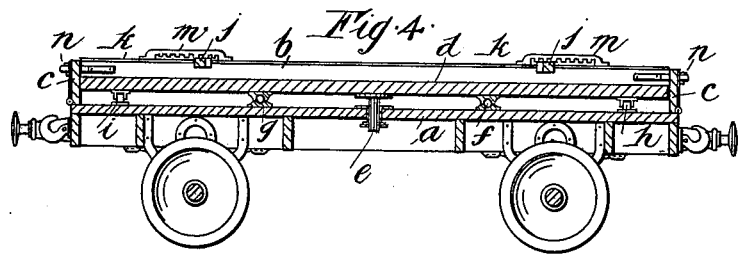
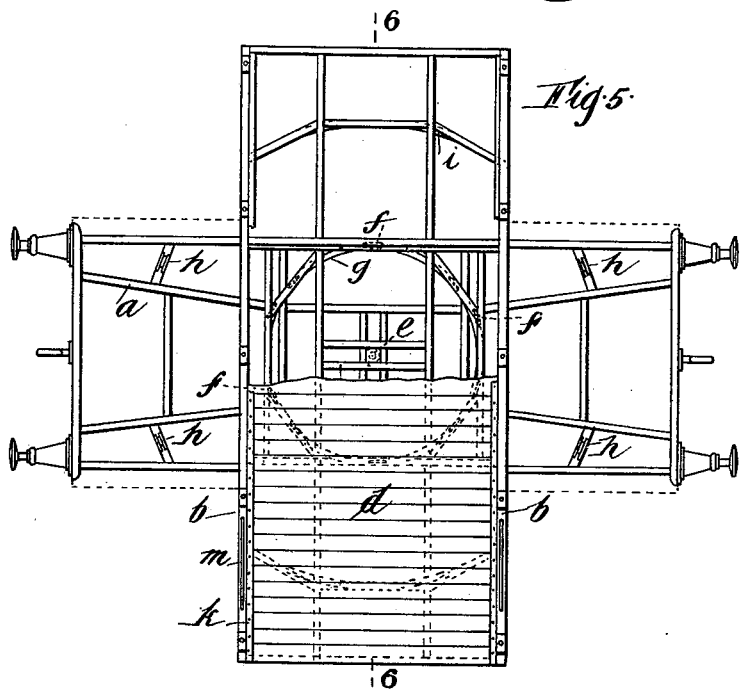
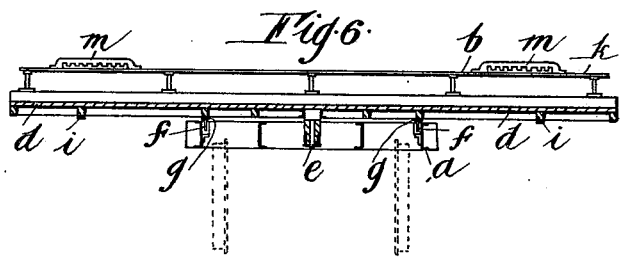

UNITED STATES PATENT OFFICE.

JOSEPH BRAGGE, OF CAMBERWELL, VICTORIA.

CARRIAGE-TRUCK FOR RAILWAYS.

SPECIFICATION forming part of Letters Patent No. 675,371, dated June 4, 1901.

Application filed September 28, 1900. Serial No. 31,438. (No model.)

*To all whom it may concern:*

Be it known that I, JOSEPH BRAGGE, engineer, a subject of the Queen of Great Britain, residing at Mononia, Waterloo street, Camberwell, near Melbourne, in the British Colony of Victoria, have invented an Improved Carriage-Truck for Railways, of which the following is a specification.

This invention relates to what are known as "carriage-trucks," such as are used on railways and tramways for the conveyance of carriages, buggies, road-vehicles, agricultural implements, and other apparatus which is mounted upon wheels.
Hitherto it has been necessary to provide docks to receive the carriage-trucks in order that they may be loaded from the end. These docks, in addition to entailing considerable expense in their construction and necessitating the use of facing-points and interlocking gear, only enable one truck at a time to be loaded, and therefore involve a great deal of shunting. Now this invention has been devised in order to provide a carriage-truck which will admit of the loading being effected from the side, thereby obviating the necessity for using docks, and enabling freight to be loaded or unloaded from an ordinary station-platform or to be shifted from one truck to another more readily than is possible with the rolling-stock at present in use, this feature being of special utility in cases where there is a break of gage.

The essential feature of my improved carriage-truck consists in the use of a revolving platform or bottom to receive the carriage or other wheeled vehicle, said platform being constructed and mounted in such a manner that it can readily be turned so as to occupy a position endwise of the truck or so that it can be swung around to project from the sides thereof, means being provided for locking it in position when the truck is traveling.

In order that my invention may be clearly understood, I will describe it by reference to the accompanying drawings, in which—

Figure 1 is a plan of a carriage-truck constructed according to this invention, showing the platform in its normal or traveling position. Fig. 2 is a similar view showing the platform swung around to the side to facilitate the loading or unloading of the truck. Fig. 3 is a vertical transverse section on line 3 3, Fig. 2; and Fig. 4 is a longitudinal vertical section of the truck on line 4 4, Fig. 1, the platform, sides, and ends of the truck being in their normal or traveling positions. Fig. 5 is a similar view to Fig. 2, but illustrating a modification of the truck. Fig. 6 is a vertical transverse section on line 6 6, Fig. 5.

The same letters of reference indicate similar or corresponding parts in all the figures.

In the arrangement illustrated in Figs. 1 to 4, $a$ represents the bottom of an ordinary carriage-truck, while $b$ and $c$ represent the sides and ends thereof, respectively.

$d$ represents a revolving platform, which constitutes the essential feature of my invention and which is mounted upon the truck by means of a king-bolt $e$ at or about its center, said platform being supported by a ring of balls or rollers $f$, working around an annular race $g$ upon the body of the truck. Small traveling rollers $h$ are mounted upon the under side of the platform $d$ near each end and are arranged to work upon segmental races $i$ to support the ends of said platform when in its normal or traveling position, as illustrated in Figs. 1 and 4.

The usual adjustable stop-bars $j$ are provided for chocking the wheels of the vehicle, so as to retain same in position on the truck, said bars being arranged to slide along and be secured in any desired position upon rails $k$, projecting inwardly from the sides $b$ of the truck and being secured thereto by pins $l$, passing through holes in the ends of said bars and in said rails, while $m$ represents racks along each side to receive straps extending down from the corners or other convenient parts of the vehicle. The sides and ends $b$ and $c$ of the truck are secured in their raised positions by the catches $n$ of any suitable construction, as shown. The carriage-truck is provided with draw-bars, buffers, and the undergear usual with carriage-trucks. Instead of mounting the revolving platform upon the bottom of the truck it might be supported directly upon the underframe, as illustrated in Figs. 5 and 6, and instead of using a ball-race, as illustrated in Figs. 1 to 4, rollers can be employed, as illustrated in said Figs. 5 and 6, and instead of the sides $b$ being hinged to the bottom of the truck they can be mounted rigidly upon the platform, and the ends *c* can be dispensed with altogether, if preferred, although it is as well to point out that if the truck be provided with ends as well as sides it can be used for the conveyance of other classes of merchandise if required.

It will be obvious to all persons skilled in the management or working of railways and tramways that carrriage-trucks constructed, as above described, with a revolving platform will possess very many advantages over those of ordinary construction by reason of the facilities for side loading and unloading which they offer.

In cases where it is necessary to tranship goods or merchandise from one set of trucks to another—as, for instance, where there is a break of gage—all that is necessary with my invention is to swing the revolving platform around until its end comes against the side of the truck on the other gage, and thus provide an easy means of communication between one truck and another.

Having now particularly described and ascertained the nature of my said invention and in what manner the same is to be performed, I declare that what I claim is—

1. The herein-described carriage-truck comprising a body portion, sides hinged thereto and arranged to swing downward, a revolving platform secured to said body portion and arranged to be held in position by the hinged sides, substantially as set forth.

2. The herein-described carriage-truck comprising a body portion, a revolving platform secured to said body portion, sides and ends arranged to lock the platform in position and to be moved out of its path when the platform is rotated, substantially as set forth.

3. The herein-described carriage-truck comprising a body portion, a revolving platform and hinged sides and ends secured to said platform, said sides and ends arranged to prevent the platform from revolving and to be swung out of the path of said platform when it is revolved, substantially as set forth.

4. The herein-described carriage-truck comprising a body portion, sides and ends hinged thereto, a platform mounted on a king-bolt on said platform, ball-bearings secured in a raceway on the body portion, a track on the platform engaging said balls, chocking-rails organized to be secured to and adjusted along the sides when in lifted position and racks secured to said sides, for the purpose set forth.

5. The herein-described carriage-truck comprising a body portion, a revolving platform secured thereon, sides, racks secured to said sides, and adjustable chocking-rails arranged to extend across said platform and be secured to the sides, substantially as set forth.

6. The herein-described carriage-truck comprising end and side sills formed of rolled shapes, intermediate sills formed of similar shapes bent at their middle toward the center of the truck and a swivel-support secured between the inwardly-bent portions of the intermediate sills, substantially as set forth.

7. The herein-described carriage-truck comprising end and side sills formed of rolled channel shapes, intermediate longitudinal sills of similar rolled shapes on either side of and bent toward the center of the truck, and a swivel-support secured between the bent portions of the intermediate sills, substantially as set forth.

JOSEPH BRAGGE.

Witnesses:
EDWARD WATERS,
WALTER SMYTHE BAYSTON.